United States Patent
Park et al.

(10) Patent No.: US 10,942,364 B2
(45) Date of Patent: Mar. 9, 2021

(54) APPARATUS FOR DRIVING OPTICAL SYSTEM WITH MEMORY UNIT

(71) Applicant: JAHWA electronics Co., Ltd., chungcheongbuk-do (KR)

(72) Inventors: Chul Soon Park, Chungcheongnam-do (KR); Je Seung Yeon, Chungcheongbuk-do (KR); Kyoung Yong Lee, Chungcheongbuk-do (KR); Sang Hwa Lee, Daegu (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 207 days.

(21) Appl. No.: 16/005,956

(22) Filed: Jun. 12, 2018

(65) Prior Publication Data
US 2019/0243156 A1   Aug. 8, 2019

(30) Foreign Application Priority Data
Feb. 8, 2018 (KR) .......................... 10-2018-0015369

(51) Int. Cl.
*G02B 27/64* (2006.01)
*G01C 15/00* (2006.01)

(52) U.S. Cl.
CPC ......... *G02B 27/646* (2013.01); *G01C 15/004* (2013.01)

(58) Field of Classification Search
CPC .... G02B 27/64; G02B 27/646; G02B 7/1821; G02B 7/18; G02B 7/182; G02B 7/1805; G02B 13/00; G02B 13/0065; H04N 5/232; H04N 5/23258; H04N 5/2328; H04N 5/2254; H04N 5/23296; H04N 5/23287; G01C 15/00; G01C 15/004; H02K 33/16; H02K 11/215; H02K 41/0358; G03B 2205/003; G03B 2205/0069; G03B 17/17
USPC ......... 359/196.1, 198.1, 199.3, 199.4, 221.2, 359/201.2, 207.8, 211.1, 212.1, 223.1, 359/555, 831, 871, 872, 877; 348/345, 348/357
See application file for complete search history.

(56) References Cited

U.S. PATENT DOCUMENTS

| | | | |
|---|---|---|---|
| 2012/0063756 A1* | 3/2012 | Kang | H04N 5/2328 396/55 |
| 2019/0121103 A1* | 4/2019 | Bachar | H04N 5/2254 |

* cited by examiner

*Primary Examiner* — Jie Lei
(74) *Attorney, Agent, or Firm* — Maier & Maier, PLLC (57) ABSTRACT

An apparatus for driving an optical system with a memory unit includes a main frame having an optical system; a base frame configured to accommodate the main frame; a driving unit configured to move the main frame in a first direction perpendicular to an optical axis with respect to the base frame; and a memory unit configured to store first reference position information that is information about a position at which the optical system is aligned in the first direction.

9 Claims, 7 Drawing Sheets

APPARATUS FOR DRIVING OPTICAL SYSTEM WITH MEMORY UNIT

FIELD

The present disclosure relates to an apparatus for driving an optical system, and more particularly, to an apparatus for driving an optical system which has improved efficiency for OIS by using information about a reference position of the optical system, stored in a memory unit.

BACKGROUND

As the hardware techniques are developed and the user environments are changed, various composite functions such as auto focus (AF) and optical image stabilization (OIS) have been integrated in a portable terminal (or, a mobile terminal) along with basic functions for communication. In recent years, it has been attempted to mount a zoom lens in which a plurality of lens groups are assembled, so that a focal length may be variably adjusted in a variable way.

Unlike a general lens, a zoom lens has a structure in which a plurality of lenses or lens groups are arranged in an optical axis direction in which light is introduced, so that its optical axis is longer in the length direction in comparison to a general lens. The light of a subject passing through the zoom lens enters a photographing element such as a charge-coupled device (CCD) or a complementary metal-oxide semiconductor (CMOS), similar to other lenses, and then image data is generated therefrom through subsequent processing.

If the zoom lens is installed in a direction in which the zoom lens stands on a main board of a portable terminal, namely in a thickness direction of the portable terminal, similar to other general lens, the portable terminal should have a space as much as the height of the zoom lens (or, the length in the optical axis direction), and in this case, it is difficult to optimize the essential characteristics of the portable terminal that is directed to a smaller size and a lighter weight.

Figure 1:
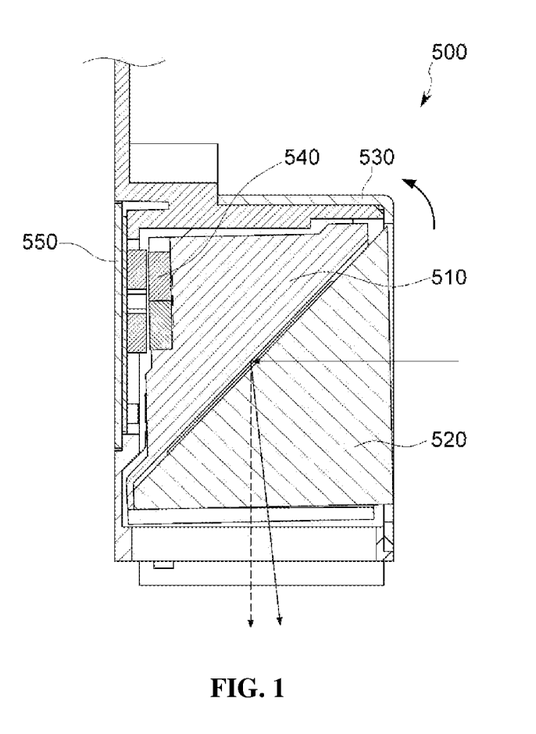
FIG. 1 is a diagram schematically showing a biasing phenomenon occurring at a conventional reflection system driving apparatus.

In order to solve this problem, as shown in FIG. 1, a reflection system driving device 500 having a reflection system 520 is installed in a thickness direction of a portable terminal, and the reflection system 520 is moved (or, rotated) to reflect the light incident from the outside toward a lens or photographing element (CCD, CMOS, etc.) installed in the length direction of the portable terminal to realize optical image stabilization.

In this method, a magnet 540 is provided at a movable body 510 having the reflection system 520, and a yoke 550 is provided at a fixed body 530 accommodating the movable body 510, so that the reflection system 520 may be flexibly moved by using the attraction force generated between the magnet 540 and the yoke 550.

The position of the reflection system 520 is controlled by moving (or, rotating) the reflection system 520 in a direction to compensate for the movement (along an X axis and a Y axis) generated by hand shaking. Thus, in order to increase the efficiency of the position control, an initial position (a default position) of the reflection system 520 is desirably set to a right position at which the direction of light reflected from the reflection system 520 and entering the lens corresponds to a direction (an optical axis) perpendicular to the lens.

However, the initial position of the reflection system 520 may not be located at the right position due to the weight thereof or the rotation or movement of the camera lens as shown in FIG. 1. In particular, in an embodiment where an attraction force by the yoke is used, the reflection system is biased to a specific direction due to the attraction force by the yoke so as not to be located at the right position.

In order to solve this problem, it is possible to measure an actual initial position of the reflection system that is not located at the right position and apply the measured result for the optical image stabilization.

However, if this method is used, a new process for inspecting or measuring an initial position of the reflection system should be additionally performed. In addition, numerous reflection system driving devices should be investigated as a whole and an algorithm corresponding to each tilting should be individually configured at every device, which however extremely lowers the process efficiency.

SUMMARY

The present disclosure is designed to solve the problems of the related art, and therefore the present disclosure is directed to providing an apparatus for driving an optical system, which may more quickly and accurately figure out an initial position of the optical system by additionally providing a memory unit storing information about the initial position of the optical system, realize more precise optical image stabilization by using the information, and simplify the process.

In one aspect of the present disclosure, there is provided an apparatus for driving an optical system with a memory unit, comprising: a main frame having an optical system; a base frame configured to accommodate the main frame; a driving unit configured to move the main frame in a first direction perpendicular to an optical axis with respect to the base frame; and a memory unit configured to store first reference position information that is information about a position at which the optical system is aligned in the first direction.

In addition, the driving unit of the present disclosure may include a first driving magnet provided at the main frame; and a first coil mounted to a circuit board to generate an electromagnetic force to the first driving magnet so that the main frame is moved in the first direction perpendicular to the optical axis with respect to the base frame.

In this case, the apparatus for driving an optical system with a memory unit according to the present disclosure may further comprise at least one first ball located between the base frame and the main frame; and a first yoke configured to generate an attraction force to the first driving magnet.

In an embodiment, the optical system of the present disclosure may be a reflection system that reflects light of a subject, incident from the outside, toward a lens of a camera module.

In this case, the apparatus for driving an optical system with a memory unit according to the present disclosure may further comprise a first hall sensor configured to sense a position of the reflection system based on the first direction, and the first reference position information may be a sensing value that is output by the first hall sensor when a direction of light reflected by the reflection system becomes parallel to the optical axis direction.

In addition, the apparatus for driving an optical system with a memory unit according to the present disclosure may further comprise a first sub magnet provided at the main frame to be spaced apart from the first driving magnet, wherein a surface of the first sub magnet facing the first hall sensor has at least two polarities.

Meanwhile, the main frame of the present disclosure may include a support frame at which the optical system is installed, the support frame having a second driving magnet; and a middle frame having the first driving magnet, the apparatus for driving an optical system with a memory unit according to the present disclosure may further comprise a second coil mounted to the circuit board to generate an electromagnetic force to the second driving magnet so that the support frame is moved in a second direction perpendicular to the optical axis with respect to the middle frame; at least one second ball located between the support frame and the middle frame; and a second yoke configured to generate an attraction force to the second driving magnet, and the memory unit may further store second reference position information that is information about a position at which the optical system is aligned in the second direction.

In an embodiment, the optical system of the present disclosure may be a reflection system that reflects light of a subject, incident from the outside, toward a lens of a camera module, and, in this case, the apparatus for driving an optical system with a memory unit according to the present disclosure may further comprise a second hall sensor configured to sense a position of the reflection system with respect to the second direction, and the second reference position information may be a sensing value that is output by the second hall sensor when a direction of light reflected by the reflection system becomes parallel to the optical axis direction.

In addition, the apparatus for driving an optical system with a memory unit according to the present disclosure may further comprise a second sub magnet provided at the main frame to be spaced apart from the second driving magnet, wherein a surface of the second sub magnet facing the second hall sensor has at least two polarities.

Meanwhile, the memory unit of the present disclosure may be mounted to the circuit board to be capable of interfacing with the outside.

In another aspect of the present disclosure, there is also provided a reference information setting device of an apparatus for driving an optical system, comprising: a generator configured to output a test signal to the apparatus for driving an optical system; an optical system driving unit configured to move the optical system, provided in the apparatus for driving an optical system, in a first direction or a second direction perpendicular to an optical axis; an input unit provided at the apparatus for driving an optical system and configured to receive a sensing value from a hall sensor that senses a position of the optical system based on the first direction or the second direction; a receiver configured to receive an output signal output from the optical system; and a main control unit configured to store the sensing value, which is output by the hall sensor when the output signal received at the receiver corresponds to a reference alignment position, in a memory unit provided in the apparatus for driving an optical system.

In an embodiment, the optical system provided in the apparatus for driving an optical system may be a reflection system that reflects a light of a subject, incident from the outside, toward a lens of a camera module, and the generator and the receiver may be provided at locations perpendicular to each other with respect to the apparatus for driving an optical system.

The apparatus for driving an optical system with a memory unit may more quickly and accurately figure out an initial position of the optical system by using the information about a reference position of the optical system, stored in the memory unit, and thus operate the optical system more precisely thereby.

In addition, in the present disclosure, since the memory unit is mounted to a circuit board to be capable of interfacing with the outside, the information about the reference position stored in the memory unit may be conveniently used in the process of inspecting the performance of the optical system driving apparatus, thereby further simplifying the process.

Further, according to another embodiment of the present disclosure, the polarities of the driving magnets are arranged differently from each other to minimize the magnetic interference generated between the driving magnets, so that the OIS function in the X-axis and Y-axis directions may be implemented more accurately and independently. Also, since the magnetic force region sensed by the sensor is expanded by using a bipolar-magnetized magnet as a sensing magnet, the OIS function may be performed more precisely.

Since the reference information setting device of the optical system driving apparatus according to the present disclosure is configured to conveniently measure the reference position of the optical system despite the complicated internal configuration of the optical system, the reference position measuring process may be performed more efficiently.

DETAILED DESCRIPTION

An apparatus for driving an optical system (hereinafter, referred to as a 'driving apparatus') 100 according to the present disclosure apparatus includes a memory unit 260 that stores information about a reference position of an optical system 110 so that the reference position of the optical system 110 may be checked more quickly and accurately, thereby enabling precise driving of the optical system.

A module or unit that is moved or rotated according to a driving characteristic and controlled to operate by using position information serving as a reference for movement or rotation may be applied as the optical system 110 of the present disclosure, regardless of its name, for example a lens included in a camera device, a reflection system such as a prism or a mirror reflecting a light of a subject incident from the outside toward the lens of the camera module, a general illumination device or a vehicle illumination device.

Hereinafter, the optical system 110 and the driving apparatus 100 of the present disclosure will be described based on a reflection system that reflects light of a subject incident from the outside toward a lens.

Figure 2:
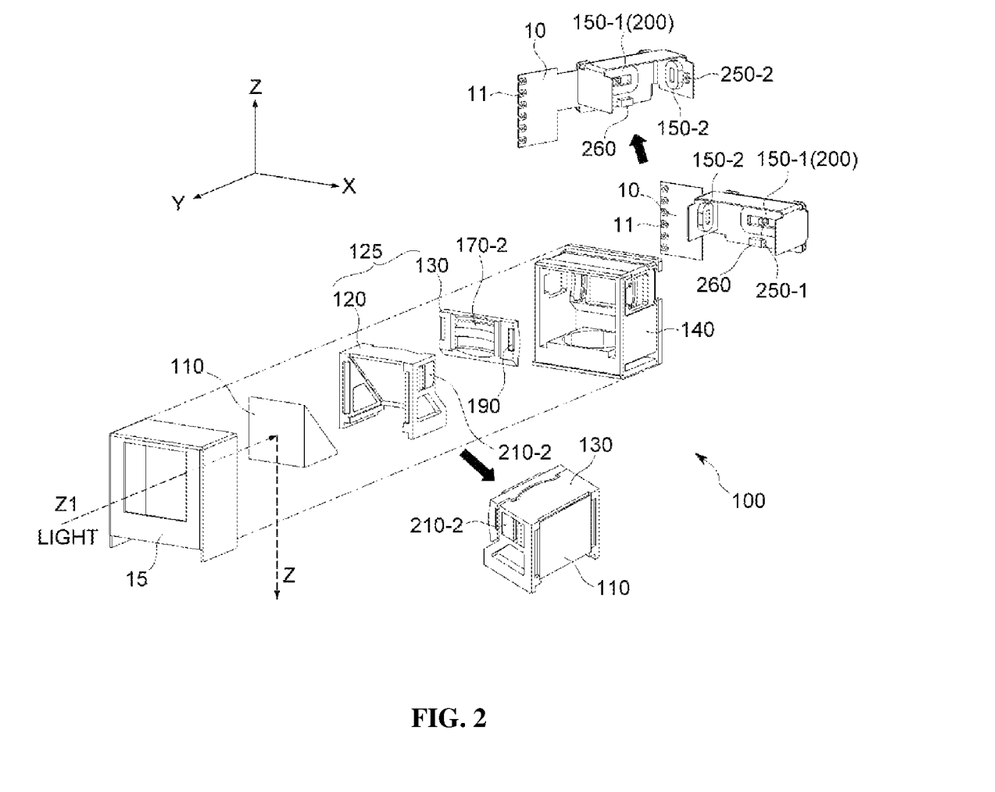
FIG. 2 is an exploded perspective view showing a detailed configuration of an apparatus for driving an optical system according to an embodiment of the present disclosure.
Figure 3:
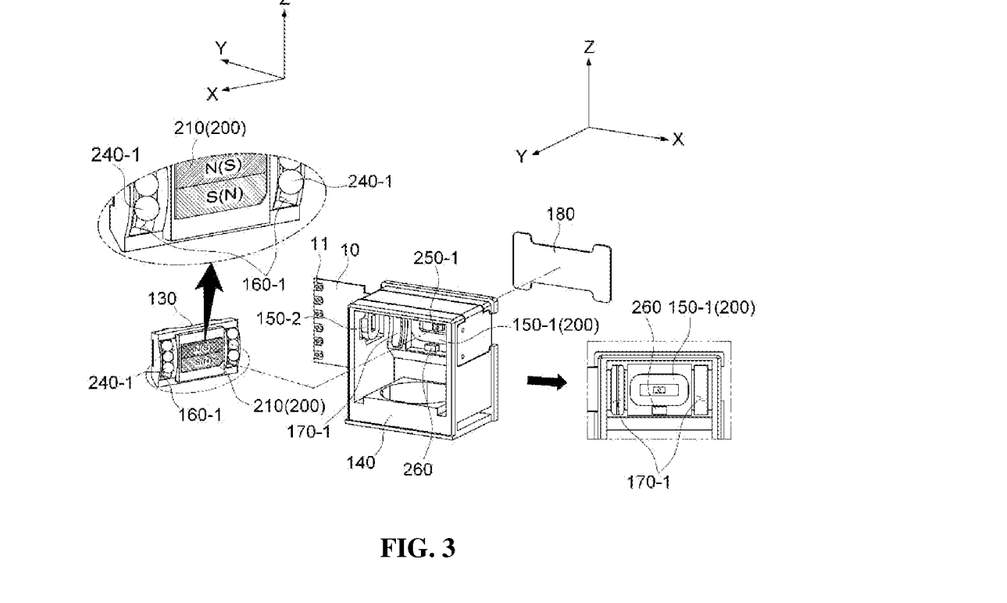
FIG. 3 is a diagram showing a coupling relation of a main frame and a base frame depicted in FIG. 2.
Figure 5A:
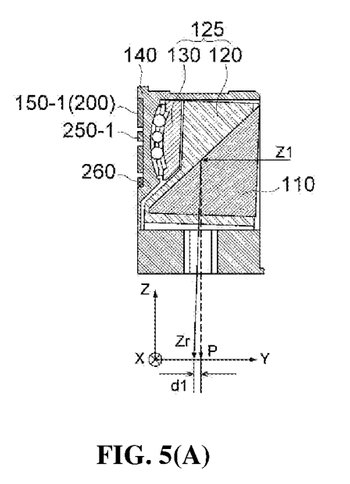
FIG. 5(A) is a diagram for illustrating a process of setting reference position information in a Y-axis direction.
Figure 5B:
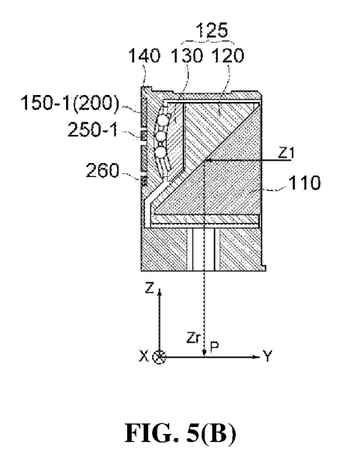
FIG. 5(B) is a diagram for illustrating a process of setting reference position information in a Y-axis direction.
Figure 5C:
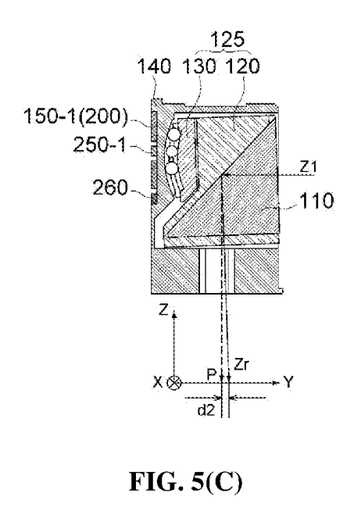
FIG. 5(C) is a diagram for illustrating a process of setting reference position information in a Y-axis direction.

FIG. 2 is an exploded perspective view showing a detailed configuration of a driving apparatus 100 according to an embodiment of the present disclosure, FIG. 3 is a diagram showing a coupling relation of a main frame 125 and a base frame 140 depicted in FIG. 2, and FIG. 5 is a diagram for illustrating a process of setting reference position information in a Y-axis direction.

Hereinafter, the detail configuration of the driving apparatus 100 according to the present disclosure and an embodiment of the optical image stabilization for the Y-axis direction among two directions perpendicular to the optical axis will be described with reference to FIGS. 2 and 3, and the reference position information in the Y-axis direction will be described in detail with reference to FIG. 5.

As shown in FIG. 2, the driving apparatus 100 of the present disclosure may include a main frame 125, a base frame 140, a driving unit 200, a memory unit 260, and the like.

As shown in FIG. 2, the light of an external subject is introduced into the driving apparatus 100 of the present disclosure through an opening formed in a case 15 via a path Z1, and the light introduced therein changes its path (by refraction or reflection) (to a Z-axis path) by the reflection system 110 of the present disclosure to move toward a lens (not shown) positioned located below the driving unit 200 of the present disclosure (based on the Z axis).

The reflection system 110 for changing the path of light may be a mirror or a prism, or a combination thereof, and may be implemented using various members capable of changing the path of light incident from the outside to an optical axis direction. The mirror or prism is preferably made of a glass material to improve the optical performance.

As described above, since the driving apparatus 100 of the present disclosure is configured to refract the path of light by the reflection system 110 to move toward the lens, the lens may not be installed in the thickness direction of a portable terminal but be installed in the length direction. Thus, the thickness of the terminal is not increased and the portable terminal may be optimized for a smaller or slimmer design.

The reflection system 110 of the present disclosure is installed at a side oriented toward the opening of the case 15 into which the light is introduced in the driving apparatus 100, namely oriented toward the front in the Y-axis direction, based on the example depicted in FIG. 2.

In the following description, the axis corresponding to the path of light moving in the vertical axis direction of the lens, namely moving into the lens, is defined as an optical axis (Z axis), and two axes on a plane perpendicular to the optical axis (Z axis) are defined as X axis and Y axis.

As shown in FIG. 2 or the like, the reflection system 110 is installed or provided at a main frame 125 that physically supports the reflection system 110, and the main frame 125 of the present disclosure is accommodated in the base frame 140 of the present disclosure in a state where the reflection system 110 installed thereto.

The main frame 125 of the present disclosure is accommodated in the base frame 140 of the present disclosure so as to be movable or rotatable in a clockwise or counterclockwise direction based on the YZ plane of FIG. 2. As the main frame 125 is moved or rotated, the reflection system 110 installed at the main frame 125 is also physically moved together.

If the reflection system 110 moves or rotates in the clockwise or counterclockwise direction with respect to the YZ plane, the light reflected from the reflection system 110 moves in the +Y direction or the −Y direction and moves into a photographing element or a lens.

Thus, in the following, in order to improve the convenience of understanding, the direction in which the main frame 125 moves or rotates is replaced with a direction in which the light of the subject moves with respect to a photographing element or a lens. That is, the direction in which the main frame 125 moves in the clockwise direction or the counterclockwise direction with respect to the YZ plane is referred to as a positive direction or a negative direction of the Y-axis direction (a first direction).

The driving unit 200 of the present disclosure corresponds to a configuration that gives a driving force to move the main frame 125 in the Y-axis direction (the first direction) perpendicular to the optical axis with respect to the base frame 140.

The configuration for giving a driving force to move the main frame 125 may be implemented in various ways and is preferably implemented using a first coil 150-1 and a first driving magnet 210-1, which use an electromagnetic force as a driving force as shown in the figures in consideration of power consumption, low noise, space utilization or the like.

In order to move the main frame 125, the first driving magnet 210-1 (see FIG. 3) is provided at the main frame 125. The first coil 150-1 for generating an electromagnetic force to the first driving magnet 210-1 is disposed on a circuit board 10 coupled to the base frame 140 as shown in FIG. 2.

When the first coil 150-1 and the first driving magnet 210-1 are used as a driving source for moving the main frame 125 in the Y-axis direction, if the power corresponding to a driving control signal is transmitted to the first coil 150-1 through the circuit board 10, the first coil 150-1 generates an electromagnetic force to the first driving magnet 210-1, and the main frame 125 moves in the Y-axis direction with respect to the base frame 140 by the electromagnetic force.

In an embodiment, as shown in FIG. 3, at least one first ball 240-1 is disposed between the main frame 125 and the base frame 140. If the first ball 240-1 is disposed in this way, the main frame 125 and the base frame 140 of the present disclosure may be kept spaced apart from each other, and the main frame 125 of the present disclosure may move in the Y-axis direction with respect to the base frame 140 with a minimized friction due to a point contact by the ball.

As shown in FIG. 3, the base frame 140 of the present disclosure may include a first yoke 180 made of a metallic material with a magnetic property at a position facing the first driving magnet 210-1.

The first yoke 180 generates an attraction force with the first driving magnet 210-1 provided at the main frame 125 to attract the main frame 125 toward the base frame 140. By the attraction force, the main frame 125 may continuously make point contact with the first ball 240-1, and the main frame 125 may be effectively prevented from being deviated to the outside.

As described above, the main frame 125 of the present disclosure is configured to move or rotate in the Y-axis direction with respect to the base frame 140. For this purpose, as shown in FIG. 3, a first groove rail 160-1 may be formed at the main frame 125 to guide the main frame 125 to move in the Y-axis direction.

The optical image stabilization is implemented by moving the light of a subject incident toward the photographing element to a direction of compensating for the movement caused by camera shaking. Thus, such that the light of the subject incident in the direction of the optical axis (Z axis) with respect to the photographing element, it is preferable that the reflection system 110, namely the main frame 125 to which the reflection system 110 is coupled, is moved to rotate.

For this, the first groove rail 160-1 formed at the main frame 125 is configured to have a rounded shape as shown in the figure to have an optimized curvature according to the rotational movement and to have a shape extending in the Z-axis length direction so as to guide the movement of the main frame 125 in the Y-axis direction.

As shown in FIG. 3, the base frame 140 of the present disclosure, which physically supports the rotation of the main frame 125 may include a first guide rail 170-1 formed at a position corresponding to the first groove rail 160-1 with a shape corresponding to the first groove rail 160-1, namely a shape extending in the Z-axis length direction in a rounded form.

The main frame 125 of the present disclosure rotates along a path corresponding to the first groove rail 160-1 having the rounded shape as described above or the first guide rail 170-1 shaped corresponding thereto.

When the base frame 140 is disposed on the main frame 125 or as a vertically bent frame structure, the first groove rail 160-1 may be provided at an upper portion of the main frame 125.

It is more preferable that the first groove rail 160-1 and the first guide rail 170-1 of the present disclosure are arranged in two rows side by side so that the shaking or clearance of the main frame 125 may be minimized.

In an embodiment, in order to keep the distance between the main frame 125 and the base frame 140 at an appropriate level, as shown FIG. 3, the first ball 240-1 may be provided so that a certain portion thereof is accommodated in the first groove rail 160-1 or the first guide rail 170-1.

Meanwhile, as described above, in the present disclosure, the information about the initial position of the reflection system 110 is stored in the memory unit 260, and the stored information is used to more quickly and accurately figure out the initial position of the reflection system 110, to implement the optical image stabilization more precisely and to simplify the process.

To this end, the memory unit 260 of the present disclosure stores first reference position information, which is information about the position at which the reflection system 110 is aligned in the Y-axis direction (the first direction). The first reference position information refers to information about the position or attitude of the reflection system 110 that allows light to be reflected in a direction parallel to the optical axis direction.

According to an embodiment, the memory unit 260 of the present disclosure may be implemented in the form of not only a hardware chip such as a read only memory (ROM) and an electrically erasable programmable read only memory (EEPROM), that may read written information but may also be implemented in a form integrated to an AF or OIS driver IC by means of an SOC (System On Chip).

In addition, in order to allow an easy access to the reference position information stored in the memory unit 260 in the process of checking the performance of the reflection system driving apparatus 100 or the reference position of the reflection system 110, the memory unit 260 of the present disclosure may be loaded on the circuit board 10 to be interfaced with the outside through an interfacing unit 11 formed at the circuit board 10.

If the memory unit 260 of the present disclosure is configured to be loaded on the circuit board 10 in a form capable of interfacing with the outside, the reference position information may be conveniently used in the process of checking the performance of the driving apparatus 100 mounted to the portable terminal or performing the OIS function, and thus it is possible to simplify the process and improve the efficiency of the OIS operation.

The memory unit 260 of the present disclosure may be provided at a side that faces the first driving magnet 210-1 as shown in FIGS. 2 and 3, or at various positions such as a side surface of the circuit board 10 in consideration of the space utilization and the arrangement relationship with other components.

If it is possible to measure the position at which the reflection system 110 is aligned in the first direction, the reference position information stored in the memory unit 260 of the present disclosure may be measured using various position measuring means such as an optical sensor and a hall sensor, explained later.

In an embodiment, the circuit board 10 may include a first hall sensor 250-1 (see FIG. 2) for sensing a position of the first driving magnet 210-1 (the reflection system 110 provided at the main frame 125) based on the first direction by using a hall effect.

If the first hall sensor 250-1 senses the position of the first driving magnet 210-1, namely the reflection system 110, an operation driver (not shown) performs feedback control so that a power of proper magnitude and direction corresponding to the position of the reflection system 110 may be applied to the first coil 150-1.

In this way, the optical position stabilization function in the first direction (the Y-axis direction) may be precisely implemented by feedback-controlling the accurate position of the reflection system 110 and corresponding power application.

The first hall sensor 250-1 may be implemented independent from the operation driver (not shown) as shown in FIG. 2 but may also be implemented as a single chip or module together with the operation driver according to an embodiment.

Since the position of the movable body is changed relatively more at an end portion thereof in comparison to a center portion thereof, the first hall sensor 250-1 of the present disclosure is preferably configured to sense an end position of the main frame 125 so that the position of the main frame 125, namely the reflection system 110 provided at the main frame 125, may be detected more effectively by the first hall sensor 250-1.

To this end, a first sub magnet 220 may be provided at the end of the main frame 125, namely at a position spaced apart from the first driving magnet 210-1, and the first sub magnet 220 may be configured to detect the position of the first sub magnet 220.

In the embodiment where the position of the reflection system 110 is detected using the first hall sensor 250-1, the first reference position information stored in the memory unit 260 of the present disclosure corresponds to a sensing value output by the first hall sensor 250-1 at the position of the reflection system 110 at which the direction of the light reflected by the reflection system 110 becomes parallel to the optical axis direction.

The process of setting the first reference position information is shown in FIG. 5 in detail. As shown in FIG. 5, the reflection system 110 may have an initial position that is rotated in the clockwise direction with respect to the YZ plane (FIG. 5(A)) or an initial position that is rotated in the counterclockwise direction with respect thereto (FIG. 5(C)).

If light is incident from the outside to the reflection system 110 in this state, the direction of the reflected light Zr is not parallel to the optical axis direction, so that the reflected light Zr is incident at a position that is spaced apart from the center position P of the lens or photographing element as much as d1 in the −direction (FIG. 5(A)) or in the +Y direction (FIG. 5(C)).

If the reflected light Zr is incident at the position deviated from the center position P, the reference position of the reflection system 110 that reflects the reflected light Zr to the center position P is searched by adjusting the position of the reflection system 110 in a direction opposite to the initial position.

Specifically, if the reflected light Zr is detected to be incident at a position spaced apart by d1 from the center position P in the −Y direction (FIG. 5(A)), the reflection system 110 is moved in the counterclockwise direction until the reflected light Zr is detected at the center position P (FIG. 5(B)).

If the reflected light Zr is detected to be incident at a position spaced apart by d1 from the center position P in the +Y direction (FIG. 5(C)), the reflection system 110 is moved in the clockwise direction until the reflected light Zr is detected at the center position P (FIG. 5(B)).

If the direction of the reflected light Zr becomes parallel to the optical axis direction and the reflected light Zr is detected at the center position P through the above process, the position of the reflection system 110 is set as the reference position, and a sensing value of the first hall sensor 250-1 output at the same time point is stored in the memory unit 260 as the first reference position information.

Figure 4:
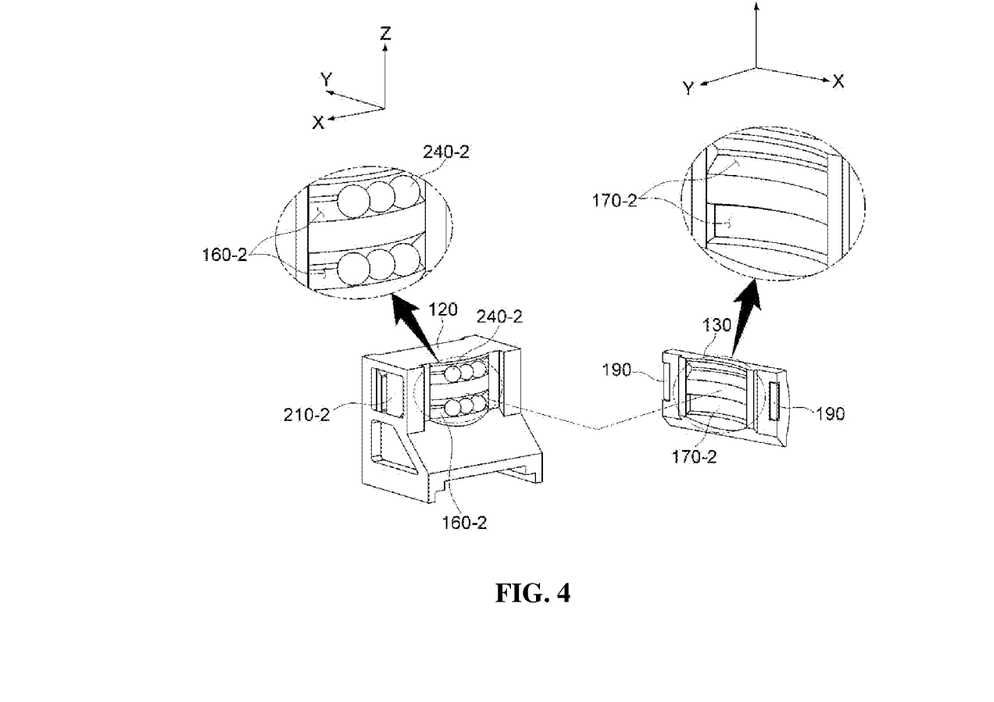
FIG. 4 is a diagram showing a coupling relation of a support frame and a middle frame depicted in FIG. 2.
Figure 6A:
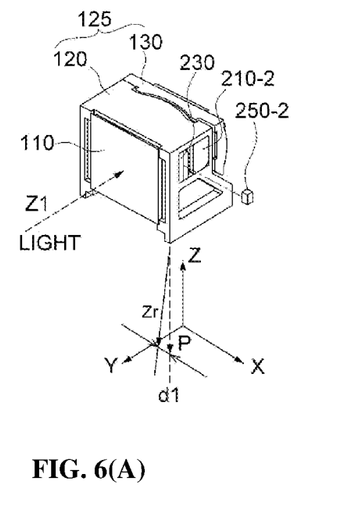
FIG. 6(A) is a diagram for illustrating a process of setting reference position information in an X-axis direction.
Figure 6B:
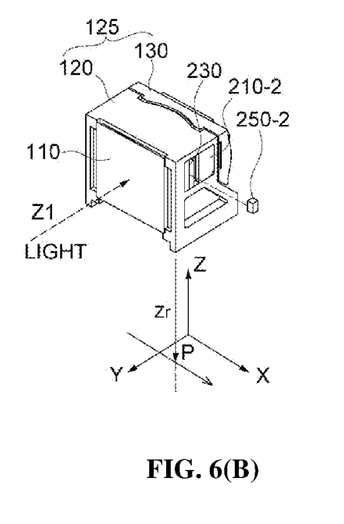
FIG. 6(B) is a diagram for illustrating a process of setting reference position information in an X-axis direction.
Figure 6C:
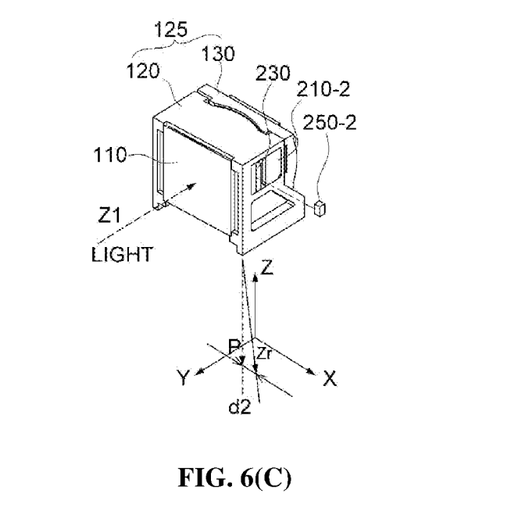
FIG. 6(C) is a diagram for illustrating a process of setting reference position information in an X-axis direction.

FIG. 4 is a diagram showing a coupling relation of a support frame 120 and a middle frame 130 depicted in FIG. 2, and FIG. 6 is a diagram for illustrating a process of setting the reference position information in the X-axis direction.

Hereinafter, the optical image stabilization in the X-axis direction among two directions perpendicular to the optical axis will be described with reference to FIGS. 2 and 4, and the process of setting the reference position information in the X-axis direction will be described in detail with reference to FIG. 6.

The driving apparatus 100 of the present disclosure may be configured to implement optical image stabilization in the Y-axis direction as well as optical image stabilization in the X-axis direction perpendicular thereto.

As described above, the optical image stabilization in the Y-axis direction is implemented by moving the main frame 125 corresponding to a movable body relative to the base frame 140 corresponding to a relative fixed body in the Y-axis direction. In this case, the first groove rail 160-1 explained above with reference to FIG. 2 is formed at the middle frame 130 of the main frame 125.

The driving apparatus 100 of the present disclosure realizes the optical image stabilization in the X-axis direction by physically dualize the main frame 125 and then using one of the dualized structures as a relative movable body and the other as a relative fixed body.

Specifically, the main frame 125 of the present disclosure includes the middle frame 130 functioning as a relative fixed body and the support frame 120 functioning as a relative movable body, and the driving apparatus 100 of the present disclosure implements the optical image stabilization in the X-axis direction by moving or rotating the support frame 120 in the X-axis direction relative to the middle frame 130.

As shown in FIG. 2 or the like, the reflection system 110 of the present disclosure is installed at the support frame 120 that physically supports the reflection system 110, and the first driving magnet 210-1 of the present disclosure described above is provided at the middle frame 130.

The support frame 120 of the present disclosure is installed at the middle frame 130 of the present disclosure to be able to move or rotate in a clockwise or counterclockwise direction based on the XY plane of FIG. 2, and as the support frame 120 moves or rotates, the reflection system 110 installed at the support frame 120 also physically moves together.

If the reflection system 110 moves or rotates in the clockwise or counterclockwise direction with respect to the XY plane, the light reflected by the reflection system 110 is deflected to the +X direction or the −X direction and enters the photographing element or the lens.

Thus, hereinafter, in order to improve the convenience of understanding, the direction in which the support frame 120 moves or rotates will be referred to as a direction in which the light of the subject moves based on the photographing element or the lens. That is, the direction in which the support frame 120 moves in the clockwise direction or the counterclockwise direction with respect to the XY plane will be referred to as a positive direction or a negative direction of the X-axis direction (the second direction).

A second driving magnet 210-2 is provided at the middle frame 130 to rotate the support frame 120, and a second coil 150-2 for generating an electromagnetic force to the second driving magnet 210-2 is loaded on the circuit board 10 coupled to the base frame 140 as shown in FIG. 2 or the like.

The second driving magnet 210-2 and the second coil 150-2 may be provided in single, but it is preferred that the second driving magnet 210-2 is respectively provided at left and right sides of the support frame 120 at positions symmetrical to each other based on the center of the support frame 120 as shown in FIG. 2 so that the second frame 150-2 is guided to be horizontally balanced (based on FIG. 2) and the driving force for optical image stabilization may be more precisely implemented by the second driving magnet 210.

The second coil 150-2 may also be provided in plural so as to face the support frame 120 in a corresponding manner.

Since the support frame 120 of the present disclosure has a structure capable of independently rotating with reference to the middle frame 130, even if the middle frame 130 is rotated in the Y-axis direction with respect to the base frame 140, the support frame 120 of the present disclosure may rotate independently in the X-axis direction if an electromagnetic force is generated at the second coil 150-2.

According to an embodiment, a second ball 240-2 may be positioned between the support frame 120 and the middle frame 130 so that the support frame 120 may move in the X-axis direction more flexibly and precisely.

In addition, a second yoke 190, which is a magnetic substance, may be provided at the middle frame 130 so that the support frame 120 is always in point contact with the second ball 240-2 due to the attraction force generated to the second driving magnet 210-2 and the support frame 120 is effectively prevented from being deviated to the outside.

As shown in FIG. 4, a second groove rail 160-2 may be formed at the support frame 120 of the present disclosure so that the movement of the support frame 120 in the X-axis direction may be more stably guided, and a second guide rail 170-2 having a shape corresponding to the second groove rail 160-2 may be provided at the middle frame 130.

The second groove rail 160-2 and the second guide rail 170-2 are shaped corresponding to each other, namely to extend in the X-axis length direction, and are formed in a round shape, or with optimized curvatures corresponding to each other, so that the rotational movement of the support frame 120 may be effectively supported.

Due to the structure of the second groove rail 160-2 and the second guide rail 170-2, the support frame 120 of the present disclosure rotates along a path corresponding to the second groove rail 160-2 or the second guide rail 170-2.

As shown in FIG. 4 or the like, the second guide rail 170-2 is preferably provided at a surface of the middle frame 130 which is different from the surface at which the first driving magnet 210-1 is provided, so that the middle frame 130 supports the rotational movement of the support frame 120 and also the middle frame 130 rotates independently relative to the base frame 140.

From a corresponding viewpoint, the first groove rail 160-1 guiding the middle frame 130 to rotate relative to the base frame 140 is also preferably provided at a surface which is different from the surface at which the second guide rail 170-2 is provided.

That is, as depicted in the figures, it is preferred that the second guide rail 170-2 is formed at one side of the middle frame 130 and the first groove rail 160-1 is formed at the other side where the second guide rail 170-2 is not provided.

In addition, the second groove rail 160-2 provided at the support frame 120 and the first groove rail 160-1 provided at the middle frame 130 are preferably formed in a direction perpendicular to each other so that the movement of the support frame 120 in the X-axis direction and the movement of the middle frame 130 in the Y-axis direction may be implemented independently.

In the embodiment where the support frame 120 moves in the X-axis direction (the second direction) with respect to the middle frame 130, the memory unit 260 of the present disclosure stores second reference position information that is information about a position at which the reflection system 110 is aligned in the second direction.

Meanwhile, a second hall sensor 250-2 for sensing the position of the second driving magnet 210-2 may be provided at the circuit board 10 to sense the position of the reflection system 110 in the X-axis direction.

The second hall sensor 250-2 detects the position of the second driving magnet 210-2, namely the position of the support frame 120 equipped with the second driving magnet 210-2 or the position of the reflection system 110.

In the embodiment where the second hall sensor 250-2 detects the position of the reflection system 110, the second reference position information stored in the memory unit 260 of the present disclosure corresponds to a sensing value that is output from the second hall sensor 250-2 at a time point when the direction of light reflected from the reflection system 110 becomes parallel to the optical axis direction.

A detailed description of the process of setting the second reference position information is shown in FIG. 6. As shown in FIG. 6, the reflection system 110 may have an initial position rotated in the clockwise direction with respect to the XZ plane (FIG. 6(A)) or an initial position rotated in the counterclockwise direction (FIG. 6(C)).

In this state, if light is incident from the outside to the reflection system 110, the direction of the reflected light Zr is not parallel to the optical axis direction, so that the reflected light Zr is incident to a position spaced apart by d1 from the center position P of the lens or the photographing element in the −X direction (FIG. 6(A)) or in the +X direction (FIG. 6(C)).

If the reflected light Zr is incident to the position deviated from the center position P, the reference position of the reflection system 110 where the reflected light Zr is reflected to the center position P is searched by adjusting the position of the reflection system 110 in a direction opposite to the initial position.

Specifically, if the reflected light Zr is detected to be incident to a position spaced by d1 from the center position P in the −X direction (FIG. 6(A)), the reflection system 110 is moved in the counterclockwise direction until the reflected light Zr is detected at the center position P (FIG. 6(B)).

If the reflected light Zr is detected to be incident to a position spaced by d1 from the center position P in the +X direction (FIG. 6(C)), the reflection system 110 is moved in the clockwise direction until the reflected light Zr is detected at the center position P (FIG. 6(B)).

When the direction of the reflected light Zr becomes parallel to the optical axis direction and the reflected light Zr is detected at the center position P in this way, the position of the reflection system 110 at this time is set as the reference position and the sensing value of the second hall sensor 250-2 output at the same time point is stored in the memory unit 260 as the second reference position information.

As described above, the driving apparatus 100 of the present disclosure may more quickly and accurately check the reference position of the reflection system 110 by storing the reference position information of the reflection system 110 in the memory unit 260 and using the same, thereby implementing the optical image stabilization more precisely and thus generating a higher quality image.

Even though the embodiment of the present disclosure has been described based on the example where the support frame 120 is rotated in the X-axis direction and the middle frame 130 (the main frame 125) is rotated in the Y-axis direction, in another embodiment, it is also possible that the support frame 120 is rotated in the Y-axis direction and the middle frame 130 (the main frame 125) is rotated in the X-axis direction as long as they are moved perpendicular to each other.

Figure 7A:
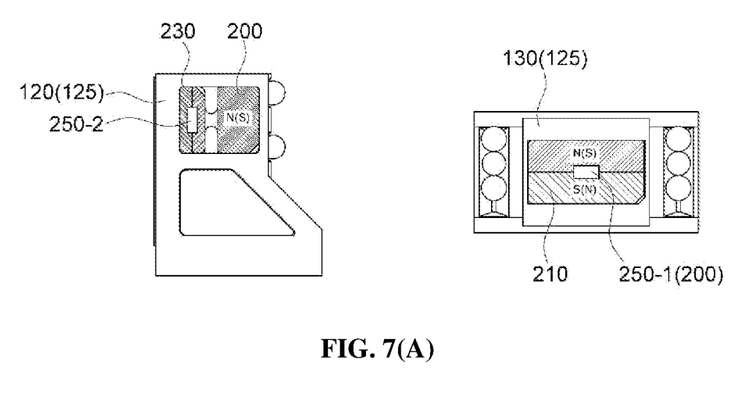
FIG. 7(A) is a diagram showing an example of the driving magnet and the sensing magnet according to the present disclosure.
Figure 7B:
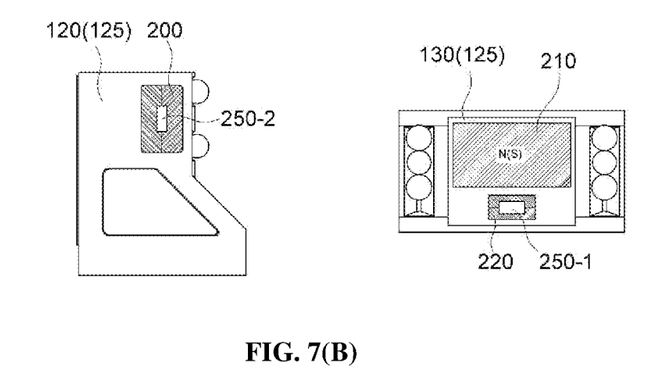
FIG. 7(B) is a diagram showing an example of the driving magnet and the sensing magnet according to the present disclosure.

FIG. 7 is a diagram showing various embodiments of the driving magnets 250-1, 250-2 and the sensing magnets 220, 230 of the present disclosure. Hereinafter, the driving magnets 250-1, 250-2 and the sensing magnets 220, 230 according to various embodiments of the present disclosure will be described in detail with reference to FIG. 7.

Normally, the initial position is set when the distance between the magnet and the hall sensor is closest. In the case of a monopolar-magnetized magnet, a largest magnetic force is detected at the initial position. In the case of a bipolar-magnetized (multipolar-magnetized) magnet, a magnetic force of "0" is detected at the initial position due to the direction of the magnetic force.

When a movable body having a magnet moves in a positive direction or a negative direction with respect to the initial position, both negative and positive magnetic forces are detected in the multipolar-magnetized magnet. Meanwhile, in the monopolar-magnetized magnet, any one of a positive magnetic force and a negative magnetic force is detected.

Thus, the change of the magnetic force detected by the hall sensor at the multipolar-magnetized magnet may be detected larger than the change of the magnetic force change detected at the multipolar-magnetized magnet.

When the magnet sensed by the hall sensor is implemented with a bipolar-magnetized (multipolar-magnetized) magnet, if the magnetic force region sensed by the hall sensor is further expanded, the expanded region may be used for magnetic force sensing, thereby enhancing the resolution of the hall sensor. Also, since the directionality (the positive direction and the negative direction) of the magnetic force may be effectively reflected in position sensing, the OIS function may be implemented more precisely.

The present disclosure shown in FIG. 7 corresponds to an embodiment in which a multipolar-magnetized magnet may be used more effectively and a magnetic field interference force capable of occurring between driving magnets may be minimized.

In the following description, when a magnetic pole of a magnet exposed to the hall sensor, namely a magnetic pole surface of the magnet facing the hall sensor, is composed of one pole (N pole or S pole), the magnet is referred to as a monopolar-magnetized magnet. Also, when a magnetic pole surface of a magnet exposed to the hall sensor, namely a magnetic pole surface of the magnet facing the hall sensor, is composed of a plurality of poles, the magnet is referred to as a multipolar-magnetized magnet.

That is, the multipolar-magnetized magnet refers to a magnet at which both an N pole and an S pole are disposed to face the hall sensor, and in an embodiment, may include a magnet at which two or more N poles and two or more S poles are disposed to face the hall sensor.

As described above, the first driving magnet 210-1 is provided at the main frame 125 of the present disclosure to generate a driving force for rotation in the Y-axis direction, and the second driving magnet 210-2 is provided at the support frame 120 of the present disclosure to generate a driving force for rotation in the X-axis direction.

As described below, one of the first driving magnet 210-1 and the second driving magnet 210-2 is made with a single pole so that the influence of the driving magnets applied to each other is reduced to allow movements in each axial direction more independently, and the other one is preferably made with two or more poles.

Based on a coil that generates an electromagnetic force to the magnet, one of the first driving magnet 210-1 and the second driving magnet 210-2 preferably has a single pole at a surface facing the coil corresponding thereto, and the other one preferably has two or more poles at a surface facing the coil corresponding thereto.

Specifically, in an embodiment, as shown in FIG. 7(a), the second driving magnet 210-2 may be configured to have a single pole at a surface facing the second coil 150-2, and the first driving magnet 210-1 may be configured to have two or more poles at a face facing the first coil 150-1.

In this case, the second hall sensor 250-2 may be configured to detect the position of the second driving magnet 210-2 provided at the support frame 120. However, in the case of the monopolar-magnetized magnet (with a single pole) as described above, as shown in FIG. 7(a), the second sub magnet 230 having two or more poles at a surface facing the second hall sensor 250-2 is provided at the support frame 120 to be spaced apart from the second driving magnet 210-2, and the second hall sensor 250-2 is preferably configured to sense the position of the second sub magnet 230.

In a corresponding viewpoint, a sensing magnet only for position sensing may be additionally provided at the middle frame 130, namely at the main frame 125. However, since the second driving magnet 210 is implemented to have multi poles (two poles), the first hall sensor 250-1 is preferably configured to sense the position of the driving magnet 210-1.

However, in this case, in order to sufficiently utilize that the moving range at the end is larger, the sensing magnet (the first sub magnet 220) having two or more poles may be provided at the end of the main frame 125 so as to be spaced apart from the first driving magnet 210-1, and the hall sensor 250-1 may be configured to detect the position of the second sub magnet 230.

Contrary to the above embodiment, as shown in FIG. 7(b), the second driving magnet 210-2 may be configured to have two or more poles at a surface facing the second coil 150-2, and the first driving magnet 210-1 may be configured to have a single pole at a surface facing the first coil 150-1.

In this case, the first hall sensor 250-1 may be configured to detect the position of the first driving magnet 210-1 provided at the main frame 125. However, since the monopolar-magnetized magnet (with a single pole) has low position sensing efficiency as described above, as shown in FIG. 7(b), the first sub magnet 220 having two or more poles at a surface facing the first hall sensor 250-1 is provided at the end of the main frame 125 so as to be spaced apart from the first driving magnet 210-1, and the first hall sensor 250-1 is preferably configured to detect the position of the second sub magnet 230.

In a corresponding viewpoint, the support frame 120 may additionally include a sensing magnet only for position sensing. However, since the second driving magnet 210-2 is implemented with multiple poles (two poles), the second hall sensor 250-2 is preferably configured to detect the position of the second driving magnet 210-2.

However, in this case, in order to sufficiently utilize that the moving range of the end is larger, the sensing magnet (the second sub magnet 230) having more than two poles may be provided at the end of the support frame 120 so as to be separated from the second driving magnet 210-2, and the hall sensor 250-2 may be configured to sense the position of the first sub magnet 220.

If the plurality of driving magnets 250-1, 250-2 are configured to have different polarity arrangements as described above, the influence of a magnetic field generated by a specific driving magnet and applied to another driving magnet may be reduced, compared to the case where the driving magnets 250-1, 250-2 have the same polarity arrangement. Thus, the movement or rotation by each driving magnet may be controlled more independently and precisely in each direction.

Further, since the plurality of driving magnets 250-1, 250-2 are configured to have different polarity arrangements and simultaneously the sensing magnet having two or more poles is additionally provided at the movable body having a monopolar-magnetized driving magnet, the movement or rotation may be controlled more independently and precisely in each direction, and the OIS function may be implemented more accurately by precise position sensing of the hall sensor.

Figure 8:
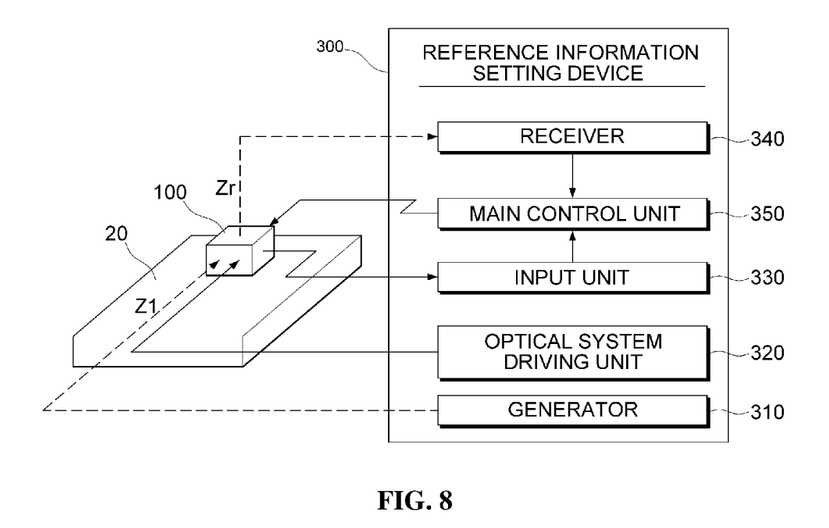
FIG. 8 is a diagram showing a reference information setting device according to an embodiment of the present disclosure.
Figure 9A:
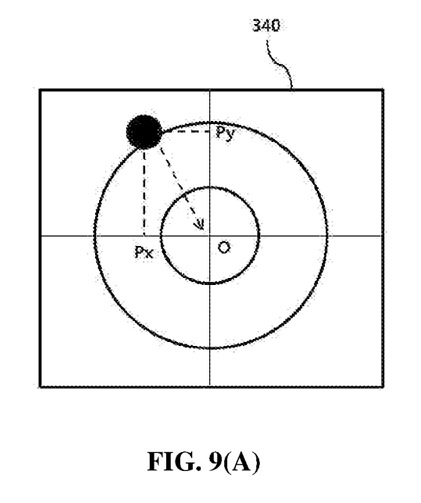
FIG. 9(A) is a diagram for illustrating a process of moving the optical system in the X-axis direction or the Y-axis direction so that an output signal received at a receiver is adjusted to correspond to a reference alignment position.
Figure 9B:
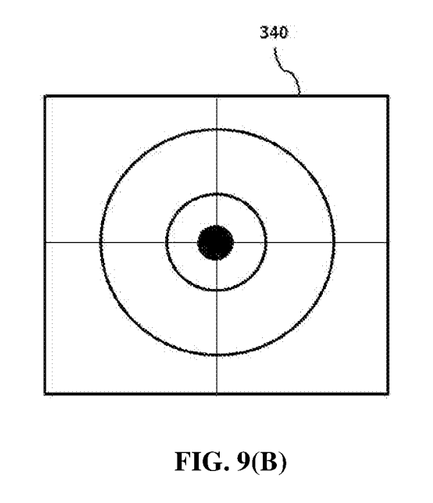
FIG. 9(B) is a diagram for illustrating a process of moving the optical system in the X-axis direction or the Y-axis direction so that an output signal received at a receiver is adjusted to correspond to a reference alignment position.

FIG. 8 is a diagram showing a reference information setting device (hereinafter, referred to as a 'setting device') 300 of the driving apparatus 100 according to an embodiment of the present disclosure, and FIG. 9 is a diagram for illustrating a process of moving the reflection system 110 in the X-axis direction or the Y-axis direction so that an output signal received at a receiver 340 is adjusted to correspond to a reference alignment position according to an embodiment of the present disclosure.

Hereinafter, referring to FIGS. 8 and 9, the setting device 300 of the present disclosure for measuring the reference position information of the optical system driving apparatus and storing the reference position information in the memory unit 260 provided at the driving apparatus 100 will be described.

As shown in FIG. 8, the setting device 300 of the present disclosure may include a generator 310, an optical system driving unit 320, an input unit 330, a receiver 340 and a main control unit 350.

First, after the driving apparatus 100 that is a target for measuring the reference position information is positioned at a jig unit 20, the generator 310 of the present disclosure outputs a test signal to the driving apparatus 100.

The test signal may be various types such as a light signal like a visible light and a laser beam, or an image including a sample pattern, if it is useable in a process of checking the position of the optical system 110 provided at the driving apparatus 100.

The test signal input to the optical system 110 is output from the optical system 110 in various ways, for example by being refracted or reflected by the optical system 110 or passing through the optical system 110.

For example, if the optical system 110 is implemented using a lens, the test signal incident to the optical system 110 is output by refracting at the optical system 110 or passing through the optical system 110 depending on the shape or angle of the lens.

If the optical system 110 is implemented using a reflection system such as a mirror or a prism, the test signal incident to the optical system 110 is output by reflecting from the optical system 110 depending on the position or attitude of the reflection system.

The output signal, which is a test signal output from the optical system 110, is received or input to the receiver 340 of the present disclosure. The receiver 340 of the present disclosure may be implemented in various forms such as a camera and a light receiving sensor as long as it is capable of receiving the output signal.

In an embodiment, a reference alignment position O may be expressed at the receiver 340 of the present disclosure as shown in FIG. 9. The reference position of the optical system 110 may be measured by controlling the optical system driving unit 320 with the reference alignment position O as a target point as explained later.

If the optical system 110 is out of the reference position or the alignment position, the output signal is detected at a point (Px, Py) spaced apart from the reference alignment position O of the receiver 340 as shown in FIG. 9(A).

In this state, the optical system driving unit 320 of the present disclosure applies power to a coil provided inside the driving apparatus 100 to move the optical system 110 in the first direction (the Y-axis direction) or in the second direction (the X-axis direction) so that the position of the output signal detected at the point (Px, Py) is moved toward the reference alignment position O.

Meanwhile, the input unit 330 of the present disclosure receives a sensing value from the hall sensor provided at the driving apparatus 100. As described above, as the optical system 110 moves in the first direction or in the second direction under the control of the optical system driving unit 320, the hall sensor also senses the position of the optical system 110 both in the first direction and in the second direction, so that the sensing value in the first direction and the sensing value in the second direction are input to the input unit 330.

As the optical system driving unit 320 moves the position of the output signal toward the reference alignment position O repeatedly, the output signal is gradually moved to the reference alignment position O of the receiver 340, and finally moved to a position corresponding to the reference alignment position O of the receiver 340.

If the output signal moves to the position corresponding to the reference alignment position O or is recognized at the position corresponding to the reference alignment position O, this means that the optical system 110 has moved to the reference position, so the main control unit 350 of the present disclosure stores the sensing value of the hall sensor at the corresponding time point in the memory unit 260 provided in the driving apparatus 100.

In this way, the setting device 300 of the present disclosure may measure the reference position information of the optical system 110 provided at the driving apparatus 100 together with various other components through simple processing of receiving the signal output from the generator 310 at the receiver 340, thereby further improving the efficiency of the measurement processing.

In an embodiment, the generator 310 and the receiver 340 of the present disclosure may be disposed to configure various positional relationships. That is, the positional relationship between the generator 310 and the receiver 340 may be changed to correspond to various parameters of a test object, such as the use, internal design and characteristics of the test object, or a test purpose.

For example, if the driving apparatus 100 having the reflection system 110 serves as a test target, since the reflection system 110 reflects the test signal at the reference position in a direction perpendicular thereto, the generator 310 and receiver 340 of the present disclosure 100 are preferably provided at positions perpendicular to each other with respect to the driving apparatus 100.

The setting device 300 of the present disclosure is configured so that the positions of the generator 310 and the receiver 340 can be changed to correspond to various parameters of the test object and a test purpose, and thus may be applied more universally.

| Reference Signs | |
|---|---|
| 100: apparatus for driving an optical system | |
| 110: optical system | 120: support frame |
| 125: main frame | 130: middle frame |
| 140: base frame | 150-1: first coil |
| 150-2: second coil | 160-1: first groove rail |
| 160-2: second groove rail | 170-1: first guide rail |
| 170-2: second guide rail | 180: first yoke |
| 190: second yoke | 200: driving unit |
| 210-1: first driving magnet | 210-2: second driving magnet |
| 220: first sub magnet | 230: second sub magnet |
| 250-1: first hall sensor | 250-2: second hall sensor |
| 260: memory unit | 300: reference information setting device |
| 310: generator | 320: optical system driving unit |

| Reference Signs | |
|---|---|
| 330: input unit | 340: receiver |
| 350: main control unit | |

What is claimed is:

1. An apparatus for driving an optical system with a memory unit, comprising:
   a main frame including a middle frame having a first driving magnet and a support frame at which a optical system is installed, the support frame having a second driving magnet, wherein the optical system is a reflection system that reflects light of a subject, incident from the outside, toward a lens of a camera module;
   a base frame configured to accommodate the main frame;
   a first coil mounted to a circuit board to generate an electromagnetic force to the first driving magnet so that the main frame is moved in a first direction perpendicular to the optical axis with respect to the base frame;
   a second coil mounted to the circuit board to generate an electromagnetic force to the second driving magnet so that the support frame is moved in a second direction perpendicular to both the optical axis and the first direction with respect to the middle frame;
   a first hall sensor configured to sense a position of the reflection system based on the first direction;
   a second hall sensor configured to sense a position of the reflection system with respect to the second direction; and
   a memory unit configured to store first reference position information that is information about a position at which the optical system is aligned in the first direction and second reference position information that is information about a position at which the optical system is aligned in the second direction,
   wherein the first reference position information is a sensing value that is output by the first hall sensor when a direction of light reflected by the reflection system becomes parallel to an optical axis direction, and
   wherein the second reference position information is a sensing value that is output by the second hall sensor when a direction of light reflected by the reflection system becomes parallel to the optical axis direction.

2. The apparatus for driving an optical system with a memory unit according to claim 1, further comprising:
   at least a first ball located between the base frame and the main frame; and
   a first yoke configured to generate an attraction force to the first driving magnet.

3. The apparatus for driving an optical system with a memory unit according to claim 1, further comprising:
   a first sub magnet provided at the main frame to be spaced apart from the first driving magnet, wherein a surface of the first sub magnet facing the first hall sensor has at least two polarities.

4. The apparatus for driving an optical system with a memory unit according to claim 2,
   further comprising:
   at least a second ball located between the support frame and the middle frame; and
   a second yoke configured to generate an attraction force to the second driving magnet.

5. The apparatus for driving an optical system with a memory unit according to claim 1, further comprising:
   a second sub magnet provided at the main frame to be spaced apart from the second driving magnet, wherein a surface of the second sub magnet facing the second hall sensor has at least two polarities.

6. The apparatus for driving an optical system with a memory unit according to claim 1,
   wherein the memory unit is mounted to the circuit board to be capable of interfacing with the outside.

7. A reference information setting device of an apparatus for driving an optical system, comprising:
   a generator configured to output a test signal to the apparatus for driving an optical system;
   an optical system driving unit configured to move the optical system provided in the apparatus for driving an optical system, in a first direction or a second direction perpendicular to an optical axis;
   an input unit configured to receive a sensing value from a hall sensor provided at the apparatus for driving an optical system that senses a position of the optical system based on the first direction or the second direction;
   a receiver configured to receive an output signal output from the optical system; and
   a main control unit configured to store the sensing value, which is output by the hall sensor when the output signal received at the receiver corresponds to a reference alignment position, in a memory unit provided in the apparatus for driving an optical system,
   wherein the memory unit configured to store first reference position information that is information about a position at which the optical system is aligned in the first direction and second reference position information that is information about a position at which the optical system is aligned in the second direction,
   wherein the optical system provided in the apparatus for driving an optical system is a reflection system that reflects a light of a subject, incident from the outside, toward a lens of a camera module,
   wherein the hall sensor includes a first hall sensor and a second hall sensor, the first hall sensor is configured to sense a position of the reflection system based on the first direction, and the second hall sensor is configured to sense a position of the reflection system with respect to the second direction,
   wherein the first reference position information is a sensing value that is output by the first hall sensor when a direction of light reflected by the reflection system becomes parallel to an optical axis direction, and
   wherein the second reference position information is a sensing value that is output by the second hall sensor when a direction of light reflected by the reflection system becomes parallel to the optical axis direction.

8. The reference information setting device of an apparatus for driving an optical system according to claim 7,
   wherein the generator and the receiver are provided at locations perpendicular to each other with respect to the apparatus for driving the optical system.

9. An apparatus for driving an optical system with a memory unit, comprising:
   an optical system, wherein the optical system is a reflection system that reflects light of a subject, incident from the outside, toward a lens of a camera module;
   a main frame supporting the optical system;
   a base frame configured to accommodate the main frame;
   a first hall sensor configured to sense a position of the reflection system based on a first direction;

a second hall sensor configured to sense a position of the reflection system with respect to a second direction;

a memory unit configured to store first reference position information that is information about a position at which the optical system is aligned in the first direction and second reference position information that is information about a position at which the optical system is aligned in the second direction; and a driving unit configured to move the main frame in a plane perpendicular to an optical axis with respect to the base frame using the first reference position information, wherein the first reference position information is a sensing value that is output by the first hall sensor when a direction of light reflected by the reflection system becomes parallel to the optical axis direction, and wherein the second reference position information is a sensing value that is output by the second hall sensor when the direction of light reflected by the reflection system becomes parallel to the optical axis direction.

* * * * *